Patented Oct. 16, 1928.

1,688,083

UNITED STATES PATENT OFFICE.

FRED W. LOMMEN, OF PITTSBURGH, PENNSYLVANIA, ASSIGNOR TO CARBIDE & CARBON CHEMICALS CORPORATION, A CORPORATION OF NEW YORK.

PROCESS OF MAKING OLEFINE ALCOHOLS.

No Drawing.          Application filed June 7, 1926.  Serial No. 114,316.

This invention relates to improvements in the manufacture of olefine alcohols by reducing the corresponding aldehydes, and in particular to the production of cinnamyl alcohol from cinnamic aldehyde by reducing the aldehyde with butyl alcohol in the presence of an aluminum alkoxy compound as a catalyst.

The invention has for one of its principal objects a process of making olefine alcohols whereby high yields are obtained.

Further objects of the invention will appear as the description proceeds.

In the reduction of olefine aldehydes to their corresponding alcohols care must be taken to reduce the aldehyde group without at the same time destroying the unsaturated double carbon linkage. For example, such agents as sodium amalgam, sodium, iron filings and zinc dust, which have been used in reducing paraffin aldehydes to their corresponding alcohols, are not suitable for use in converting unsaturated aldehydes into unsaturated alcohols for the reason that they react upon the double bond and the aldehyde group simultaneously and, unless special means are taken to protect the double bond, it will become broken and conversion of the unsaturated aldehyde into a saturated compound will take place.

I have found that aluminum alkoxy compounds when used to promote the reduction of olefine aldehydes in alcohol solutions cause the reaction to proceed in a smooth manner with high yields of the corresponding unsaturated alcohol, which may be readily separated from the reaction mixture in a substantially pure state.

The reaction which takes place between an olefine aldehyde and a paraffin alcohol in the presence of an aluminum alkoxy compound may be illustrated by the following equation:

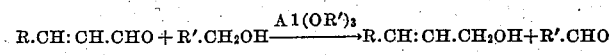

$$R.CH:CH.CHO + R'.CH_2OH \xrightarrow{Al(OR')_3} R.CH:CH.CH_2OH + R'.CHO$$

where R represents either an alkyl or aryl residue and R' represents an alkyl residue.

In a specific example, cinnamyl aldehyde is heated with butyl alcohol containing aluminum butoxide as catalyst in solution, using a quantity of butyl alcohol slightly in excess of the amount indicated by the stoicheiometric ratio of the above equation, at 100° C. until substantially all of the aldehyde is converted into alcohol. This will usually require about eight hours. Sulfuric acid in water solution and in amount not greater than that theoretically necessary to decompose the butoxide is then added to the reaction mixture. At the same time the mixture is vigorously stirred and cooled. Upon standing the mixture separates into two layers. The upper layer, containing principally cinnamyl alcohol and residual butyl alcohol, is removed and the lower aqueous layer is extracted with benzene to recover any cinnamyl alcohol present in such layer. The benzene extract is added to the upper layer and the resulting mixture is freed from traces of sulfuric acid by agitation with a sodium carbonate solution. The upper layer is separated from the aqueous liquid and distilled until free from benzene. The portion remaining after the distilling operation is fractionated in vacuo, the cinnamyl alcohol distilling at 116° C. under a pressure of 7 mm. Yields approximating 95% of theory are obtainable.

The butyraldehyde formed simultaneously with the cinnamyl alcohol is converted to butyl butyrate under the influence of the aluminum butoxide catalyst. The butyl butyrate is separated from the cinnamyl alcohol in the fractional distillation in vacuo above-described and constitutes a valuable by-product which may be recovered in any convenient manner.

While aluminum butoxide and butyl alcohol have been mentioned as the preferred catalyst and alcohol, respectively, it is to be understood that other aluminum alkoxy compounds and other alcohols may be used. For example, good results may be obtained with aluminum ethoxide and ethyl alcohol.

I claim:

1. Process of making an olefine alcohol which comprises bringing the corresponding aldehyde into contact with a paraffin alcohol in the presence of aluminum butoxide as a catalyst.

2. Process of making a phenylolefine alcohol which comprises bringing the corresponding aldehyde into contact with a paraffin alcohol in the presence of an aluminum alkoxy compound as a catalyst.

3. Process of making a phenylolefine alcohol which comprises bringing the corresponding aldehyde into contact with a paraffin alcohol in the presence of aluminum butoxide as a catalyst.

4. Process of making a phenylolefine alcohol which comprises bringing the corresponding aldehyde into contact with butyl alcohol in the presence of aluminum butoxide as a catalyst.

5. Process of making cinnamyl alcohol which comprises bring cinnamyl aldehyde into contact with a paraffin alcohol in the presence of an aluminum alkoxy compound as a catalyst.

6. Process of making cinnamyl alcohol which comprises bringing cinnamyl aldehyde into contact with butyl alcohol in the presence of aluminum butoxide as a catalyst.

7. Process of making cinnamyl alcohol which comprises bringing cinnamyl aldehyde into contact with butyl alcohol in the presence of aluminum butoxide as a catalyst while maintaining the reaction mixture at a temperature of about 100° C.

In testimony whereof, I affix my signature.

FRED W. LOMMEN.